(12) United States Patent
Vickers, Jr. et al.

(10) Patent No.: US 6,429,266 B2
(45) Date of Patent: *Aug. 6, 2002

(54) THERMAL GRAFTS OF POLYAMIDES WITH PENDANT CARBOXYLIC ACID GROUPS, METHODS FOR PRODUCING THE SAME, COMPOSITIONS CONTAINING THE SAME, AND METHODS OF USING THE SAME

(75) Inventors: Thomas M. Vickers, Jr., Concord Township, OH (US); C. Steven Sikes, Mobile, AL (US)

(73) Assignees: University of South Alabama, Mobile, AL (US); MBT Holding, AG, Zurich (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,452

(22) Filed: Jun. 30, 1998

(51) Int. Cl.[7] ............................................. C08L 77/00
(52) U.S. Cl. ....................................... 525/420; 525/926
(58) Field of Search .................................. 525/420, 926

(56) References Cited

U.S. PATENT DOCUMENTS 5,342,918 A * 8/1994 Howelton et al. .......... 528/318
5,408,028 A    4/1995 Wood et al. ................ 528/328
5,756,571 A * 5/1998 Moore ........................ 524/425
5,925,728 A * 7/1999 Kim et al. ................... 528/328

FOREIGN PATENT DOCUMENTS

EP    0 294 905    12/1988
EP    0 821 933    2/1998

OTHER PUBLICATIONS

Derwent Abstracts, AN 1992–402265, JP 04 298533, Oct. 22, 1992.

Derwent Abtracts, AN 1983–803604, JP 58–105758, Jun. 23, 1983.

Patent Abstracts of Japan, vol. 1998, No. 01, Jan. 30, 1998, JP 09–235372, Sep. 9, 1997.

* cited by examiner

Primary Examiner—Ana Woodward
(74) Attorney, Agent, or Firm—Millen, White, Zelano & Branigan, P.C.

(57) ABSTRACT

Heating an intimate mixture of: (a) a polyamide which contains pendant carboxylic acid groups; and (b) a compound which contains an amino group efficiently affords graft polymers with a high graft density. Such graft polymers are particularly useful as additives for cementitious compositions.

29 Claims, 6 Drawing Sheets

THERMAL GRAFTS OF POLYAMIDES WITH PENDANT CARBOXYLIC ACID GROUPS, METHODS FOR PRODUCING THE SAME, COMPOSITIONS CONTAINING THE SAME, AND METHODS OF USING THE SAME

BACKGROUND OF THE INVENTION

1. Field of the Invention

The present invention relates an efficient method of grafting compounds which contain an amino group, such as polyoxyalkylene amines, to polyamides, such as polyaspartic acid, polyglutamic acid, and copolymers of aspartic and glutamic acids, with pendant carboxylic acid groups. The present method also relates to the graft polymers produced by such a process. The present invention further relates to compositions which contain such graft polymers and methods of using such graft polymers.

2. Discussion of the Background

Polyaspartate is economically produced by the thermal polymerization of aspartic acid or precursors of aspartic acid such as maleic acid and ammonia. The initial product is polysuccinimide (synonyms: polyanhydroaspartic acid, polyaspartimide), which is composed of residues of succinimide, the cyclic imide of aspartic acid. A review of patents and other literature dating to 1850 on the synthesis of polyaspartate and polysuccinimide is provided in U.S. Pat. No. 5,594,077 (Groth et al), which is incorporated herein by reference. The production of polyaspartic acid by the thermal polymerization of aspartic acid and hydrolysis of the thus-obtained polysuccinimide is shown schematically below:

Synthesis of potentially useful derivatives of polysuccinimide and polyaspartate also has a long history. A common approach has been the nucleophilic addition of primary amines such as ethanolamine to form an amide linkage upon opening of the imide ring of a succinimide residue, producing a polysuccinimide with pendant groups (see: U.S. Pat. No. 3,846,380 (Fujimoto et al)). Because polysuccinimide is insoluble in water, the reactions are normally accomplished in organic solvents such as dimethyl formamide or N-methyl pyrrolidone. The derivatized polysuccinimide can be converted to a derivatized polyaspartate by mild alkaline hydrolysis of the remaining imide rings.

Thermal copolymerization of aspartic acid and other monomers also has frequently been reported beginning with U.S. Pat. No. 3,052,655 (Fox et al) and extending to U.S. Pat. No. 5,658,464 (Hann et al). U.S. Pat. No. 5,357,004 (Wood et al); U.S. Pat. No. 5,442,038 (Wood et al); U.S. Pat. No. 5,502,117 (Wood et al); U.S. Pat. No. 5,510,426 (Wood et al); U.S. Pat. No. 5,510,427 (Wood et al); U.S. Pat. No. 5,519,110 (Wood et al); U.S. Pat. No. 5,521,279 (Wood et al); U.S. Pat. No. 5,371,179 (Paik et al); U.S. Pat. No. 5,371,177 (Paik et al); U.S. Pat. No. 5,410,017 (Bortnick et al); and U.S. Pat. No. 5,478,919 (Koskan et al) disclose copolymers produced by synthetic routes that included monoamines of polyoxyalkylenes. Applications such as detergent additives, dispersants, corrosion inhibitors, antiscalants, additives to fertilizers, additives to oral health care products and cosmetics, and others were disclosed.

Japanese Patent Application 7-172888 (Nagatomo et al) discloses derivatives of polysuccinimide and polyaspartate prepared by nucleophilic addition of monoamines such as ethanolamine and taurine to polysuccinimide in dimethyl formamide or water. Cement admixtures containing polyaspartic acid and these derivatives are disclosed, and some effects on the flow of Portland cement are disclosed.

Derivatives of polyaspartate have also been formed by thermal addition of coreactants to a preformed polyaspartate. U.S. Pat. No. 5,247,068 (Donachy et al); U.S. Pat. No. 5,260,272 (Donachy et al); and U.S. Pat. No. 5,284,936 (Donachy et al) disclose that the use of a preformed polyaspartate as a reactant lead to improvements as compared to the copolymerization of monomeric reactants.

U.S. Pat. No. 5,552,516 (Ross et al); U.S. Pat. No. 5,612,384 (Ross et al); U.S. Pat. No. 5,461,085 (Nagatomo et al); U.S. Pat. No. 5,525,682 (Nagatomo et al); U.S. Pat. No. 5,525,703 (Kalota) and WO 95/35337 (Ross et al); WO 96/08523 (Ross et al); and EP 0 658 586 A1 (Nagatomo et al) each disclose aqueous reactions of diamines with polysuccinimide to effect nucleophilic addition at elevated pH with the object of producing water-soluble, high MW, crosslinked polyaspartates upon alkaline treatment of the crosslinked polysuccinimides. Alternatively, if the degree of crosslinking is sufficient, water-absorbent, insoluble materials were produced.

A problem with this approach is that the OH⁻ groups in water at elevated pH compete with the NH$_2$ groups of the diamines to donate electrons to imide rings of the polymer, thus ring-opening the polysuccinimide residues by hydrolysis. Another problem is that the polysuccinimide is hydrophobic and water-insoluble such that much of the polysuccinimide is not readily available for reactions in the aqueous phase. Consequently, elevated amounts of diamines are required and the reactions are inefficient and incomplete, leaving partially reacted as well as unincorporated diamines.

U.S. Pat. No. 5,639,832 (Kroner et al) discloses the aqueous reaction of monoamino compounds such as amino ethyl sulfonate (taurine), other amino acids, and monoamino poly(propylene-ethylene)glycol with polysuccinimide at elevated pH. Graft efficiency no higher than 60% was reported. The materials produced by the reactions, which include the entire mixture of reactants and products at the end of the reactions, are disclosed as being useful as detergent additives, dispersants, and antiscalants.

In addition to polyaspartates, other polyanionic polymers such as polyacrylates have been derivatized with polyoxyalkylene side chains via thermal reaction of monofunctional groups of the derivatizing compound and the carboxyl groups of the polymer (see: U.S. Pat. No. 5,393,343 (Darwin et al); U.S. Pat. No. 5,614,017 (Shawl); and U.S. Pat. No. 5,670,578 (Shawl)). The derivatized polyacrylates are disclosed as being useful for improving the rheological properties of cement, acting as water-reducing and plasticizing additives.

Dispersants are used to improve the flow characteristics of cement slurries by breaking up cement agglomerates and freeing the water, thus giving the slurries of lower viscosity and allowing desirable flow conditions to be obtained at lower pump pressures. V. S. Ramachandran, *Concrete Admixtures Handbook: Properties, Science, and Technology,* Second Edition, Noyes Publications, 1995, which is incorporated herein by reference. Superplasticizers such as sulfonated melamine formaldehyde condensate (SMF) and sulfonated naphthalene formaldehyde condensate (BNS) are commonly used as dispersants. However, these compounds require more than the desired amount of material to achieve a desired level of concrete workability or water reduction. In addition, these materials do not achieve the full range of water reducing capability for the various types of concrete admixtures (e.g., Type A and Type F as defined in ASTM C494 etc.).

It is important that dispersants are used in concrete situations where strength and durability are involved, as dispersants are a necessary component in high strength and high durability concretes. Due to the use of low water amounts in the high performance concretes, sometimes high dispersant amounts are necessary to achieve workable concretes. High BNS levels can lead to undesirable retardation of set and may not provide the required workability retention over time.

It is desirable to provide a material that is several times more efficient as a cement or concrete dispersant than the traditional materials like BNS and SMF. Improving efficiency reduces the amount of material required to achieve a desired level of concrete workability or water reduction. With respect to BNS and SMF, it is also desirable to improve slump retention while maintaining normal setting characteristics. Providing a dispersant with full range (Type A and F) water reducing capability is also a desirable characteristic.

Thus, there remains a need for a method of preparing polyamides, such as polyaspartatic acid and polyglutamic acid, which contain pendant carboxylic acid groups grafted with amino compounds, such as methoxylated polyoxyalkylene amines, in high yield without the use and expense of excess coreactants or organic solvents. Such a method would involve no waste disposal and produce no harmful byproducts. There also remains a need for improved surfactants and dispersants for use as additives to cementitious materials.

SUMMARY OF THE INVENTION

Accordingly, it is one object of the present invention to provide a novel method of grafting compounds which contain amino groups to polyamides, such as polyaspartic acid and polyglutamic acid, which contain pendant carboxylic acid groups.

It is another object of the present invention to provide a method of grafting compounds which contain amino groups to polyamides, such as polyaspartic acid and polyglutamic acid, which contain pendant carboxylic acid groups which method achieves a high graft efficiency and therefore does not require the use of excess grafting agent.

It is another object of the present invention to provide a method of grafting compounds which contain amino groups to polyamides, such as polyaspartic acid and polyglutamic acid, which contain pendant carboxylic acid groups which method does not require the use of organic solvents.

It is another object of the present invention to provide a method of grafting compounds which contain amino groups to polyamides, such as polyaspartic acid and polyglutamic acid, which contain pendant carboxylic acid groups which method affords graft polymers with a high graft density.

It is another object of the present invention to provide novel graft polymers in which compounds which contain amino groups are grafted to polyamides, such as polyaspartic acid and polyglutamic acid, which contain pendant carboxylic acid groups.

It is another object of the present invention to provide novel graft polymers, having a high graft density, in which compounds which contain amino groups are grafted to polyamides, such as polyaspartic acid and polyglutamic acid, which contain pendant carboxylic acid groups.

It is another object of the present invention to provide novel compositions which contain such graft polymers in which compounds which contain amino groups are grafted to polyamides, such as polyaspartic acid and polyglutamic acid, which contain pendant carboxylic acid groups.

It is another object of the present invention to provide novel methods of improving the flow properties of cement.

These and other objects of the present invention, which will become apparent during the following detailed description, have been achieved by the inventors' discovery that heating an intimate mixture of a polyamide, such as polyaspartic acid and polyglutamic acid, which contains pendant carboxylic acid groups with a compound which contains an amino group affords a graft polymer in which the compound which contains an amino group is grafted to the polyamides which contain pendant carboxylic acid. The inventors have also discovered that the graft polymers so produced are useful as additives to cementitious materials.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8a and 8b are the gel permeation chromatography profiles of products of the reaction of Comparative Example 4, an attempt to copolymerize sodium aspartate and polyoxyalkylene amine by thermal treatment at 180° C. FIG. 8a: sample after 2 hours of thermal treatment. FIG. 8b: sample after 20.5 hours of thermal treatment. Peak 1, polyoxyalkylene amine: peak 2, salt.

DETAILED DESCRIPTION OF THE PREFERRED EMBODIMENTS

Thus, in a first embodiment, the present invention provides a method for producing graft polymers in which compounds which contain amino groups are grafted to polyaspartic acid. The present method involves:

(i) heating an intimate mixture of a polyamide which contains pendant carboxylic acid groups, such as polyaspartic acid, polyglutamic acid, and copolymers of aspartic and glutamic acids, with a compound which contains an amino group.

The polyamides which contain pendant carboxylic acid groups will in many cases have the general formula (I):

(I)

wherein:
  each X independent of the other is hydrogen, an alkali metal ion, an alkaline earth metal ion, ammonium ion, or substituted ammonium, with the proviso that at least 50 mole %, preferably at least 75 mole %, more preferaby at least 100 mole %, of X is hydrogen;
  each —NH—Z— is a monomer unit derived from a compound which contains (i) a —NH$_2$ group and (ii) a —CO$_2$H or a —SO$_3$H group;

each n, independently of the other, is 0 or an integer of 1 to 20, preferably 0 to 2;
  each m, independently of the other, is 0 or an integer of 1 to 20, preferably 0 to 2;
  q, r, and s reflect the mole fraction of each type of monomer unit, wherein the sum of q+r+s equals one, wherein q is a decimal value from 0 to 0.95, preferably 0 to 0.50 more preferably 0 to 0.25; r is a decimal value of 0.05 to 1, preferably 0.50 to 1, more preferably 0.75 to 1; and s is a decimal value of 0 to 0.50, preferably 0 to 0.25, more preferably about 0.

Suitably the total number of monomer units in the polyamide is 5 to 1000, preferably 10 to 250.

Examples of substituted ammonium include mono-, di-, tri-, and tetra-C$_{1-4}$-alkylammonium and mono-, di-, tri-, and tetra-C$_{2-4}$-alkoxyammonium.

Examples of the compound which contains: (i) a —NH$_2$ group and (ii) a —CO$_2$H or a —SO$_3$H group; include glycine, alanine, valine, leucine, isoleucine, asparagine, glutamine, p-aminobenzoic acid, sulfanilic acid, H$_2$N(CH$_2$)$_{n''}$CO$_2$H (where n" is an integer of 2–8, preferably 6), etc. Thus, Z may be, e.g.:

| Compound | Z |
|---|---|
| glycine | —CH$_2$—C(=O)— |
| alanine | —CH(CH$_3$)—C(=O)— |
| leucine | —CH((CH$_3$)$_2$CHCH$_2$)—C(=O)— |
| isoleucine | —CH(CH$_3$CH$_2$CH(CH$_3$))—C(=O)— |
| valine | —CH((CH$_3$)$_2$CH)—C(=O)— |
| asparagine | —CH(H$_2$NC(=O)CH$_2$)—C(=O)— |
| glutamine | —CH(H$_2$NC(=O)CH$_2$CH$_2$)—C(=O)— |
| p-aminobenzoic acid | —C$_6$H$_4$—C(=O)— |
| sulfanilic acid | —C$_6$H$_4$—S(=O)$_2$— |

-continued

| Compound | Z |
|---|---|
| H$_2$N(CH$_2$)$_{n'}$-CO$_2$H | —(CH$_2$)$_{n''}$—C(=O)— |
| CONH(CH$_2$)$_{1-6}$SO$_3$X<br>\|<br>CH$_2$<br>\|<br>H$_2$NCHCO$_2$H | CONH(CH$_2$)$_{1-6}$SO$_3$X<br>\|<br>CH$_2$<br>\|<br>H$_2$NCHCO$_2$H |
| CONH(CH$_2$)$_{1-6}$PO$_3$X$_2$<br>\|<br>CH$_2$<br>\|<br>H$_2$NCHCO$_2$H | CONH(CH$_2$)$_{1-6}$PO$_3$X$_2$<br>\|<br>CH$_2$<br>\|<br>H$_2$NCHCO$_2$H |

In a preferred embodiment, the polyamide which contains pendant carboxylic acid groups is polyaspartic acid (n is 0 or 1 and m is 0 or 1) or polyglutamic acid (n is 0 or 2 and m is 0 or 2). In a particularly preferred embodiment, the polyamide which contains pendant carboxylic acid groups is polyaspartic acid. Although the present process will be discussed below with particular reference to polyaspartic acid, it is to be understood that when applicable the considerations discussed in the context of polyaspartic acid, e.g., molecular weight, degree of neutralization, residue substitution, etc., apply to the other polyamides which contain pendant carboxylic acid groups, as well.

There is no limitation on the type of polyaspartic acid which can be used in the present process. In particular, it should be understood that the polyaspartic acid used in the present process may contain either α or β amide type residues or any combination of α and β amide type residues, which are shown below:

α-amide linkage

β-amide linkage

It should also be understood that the polyaspartic acid used in the present invention may be in a form in which a certain number of the aspartic acid residues are in the imide or succinimide form:

succinimide linkage

Thus, up to 95%, preferably up to 50%, more preferably up to 10%, even more preferably essentially none, of the aspartic acid residues may be in the imide or succinimide form in the polyaspartic acid used in the present process.

The polyaspartic acid will typically have a gel permeation molecular weight of 1000 to 30,000, but it is possible to use polyaspartic acids which have a molecular weight outside this range. Good results have been achieved using polyaspartic acid having a gel permeation molecular weight of 1000 to 30,000, and even more typically 2000 to 10,000.

The polyaspartic acid may be prepared by any conventional process for producing polyaspartic acid. For example, the polyaspartic acid may be produced by solid state synthesis or the thermal polymerization of aspartic acid or precursors of aspartic acid such as maleic acid and ammonia followed by mild, alkaline hydrolysis of the polysuccinimide to produce polyaspartate and followed by acidification to produce polyaspartic acid, accompanied by the removal of cations. A review of the synthesis of polyaspartic acid is provided in U.S. Pat. No. 5,594,077, which is incorporated herein by reference. Other methods of producing polyaspartic acid are disclosed in PCT Application No. WO 97/18249, Great Britain Patent No. 2307689, and Japanese Patent Application No. 5-321720, which are incorporated herein by reference.

The present process utilizes polyaspartic acid as opposed to polyaspartate. In the context of the present invention, the term polyaspartic acid includes polymers in which a small number of the pendant carboxy groups are neutralized. Thus, in the present method, at least 50%, preferably at least 75%, more preferably at least 100%, of the pendant carboxy groups in the polyaspartic acid are acidified as opposed to being salified.

In a preferred embodiment, the polyaspartic acid is essentially free of extraneous ions. As noted above, polyaspartic acid may be produced by the acidification of polyaspartate. In polyaspartate the pendent carboxylate groups are associated with a cation, typically sodium. Thus, the acidification of the sodium polyaspartate with an acid, e.g., hydrochloric acid, will yield, in addition to the desired polyaspartic acid, a salt such as sodium chloride. It is preferred that the polyaspartic acid used in the present process be essentially free of extraneous ions from such salts. A preferred way to avoid such salts is to convert the polyaspartate (e.g., sodium polyaspartate) to polyaspartic acid by dialysis against aqueous HCl (0.01 N HCl) followed by lyophilization (HCl is essentially completely removed by lyophilization). Alternatively, it is possible to use such a dialysate as is without lyophilization. It is also possible to convert the polyaspartate to polyaspartic acid by means of an ion exchange resin such as amberlyst. In the context of the present invention, the term essentially free of extraneous ions means that the polyaspartic acid contains less than 20 wt. %, preferably less than 5 wt. %, more preferably less than 1 wt. %, of salt (e.g., NaCl), based on the total weight of the polyaspartic acid.

The compound containing the amino group may be any medium to low molecular weight (MW less than 25,000, preferably less than 10,000) amine which does not contain any other functional group which would interfere with the grafting reaction. Specific examples of such compounds containing an amino group include simple amines, such as include aliphatic monoamines ($H_2NR$, where R is $C_{1-22}$ alkyl), arylaliphatic monoamines, ($H_2NR'$ where R' is $C_{6-10}$ aryl, $C_{7-15}$ alkylaryl, or $C_{7-15}$ arylalkyl), $C_{2-4}$ alkanolamines, polyoxyalkylene monoamines, aminosulfonates (such as $H_2N(CH_2)_{1-6}SO_3X$), aminophosphonates (such as $H_2N(CH_2)_{1-6}PO_3X$), and hydrophobic amino acids. Preferred monoamines include ethanolamine, propylamine, leucine, isoleucine, valine, monoamino copolyethylene:propylene, laurylamine, and stearylamine. Particularly preferred monoamines include ethanolamine, leucine, isoleucine, valine, and laurylamine, and monoamino copolyethylene:propylene. A preferred class of compounds containing an amino group include the polyoxyalkylene amines of the general the formula (II):

wherein $R^2$ and $R^6$ are, each independently, H, phenyl, substituted phenyl, or $C_1$ to $C_4$ linear or branched alkyl, such as methyl, ethyl, propyl, or butyl; $R^5$ is phenyl or $C_1$ to $C_4$ linear or branched alkylene, such as methylene, ethylene, propylene, or butylene; $R^3$ is ethylene, and $R^3O$ is present randomly or in block form; e is 1 to about 300, preferably about 11 to about 300; $R^4$ is propylene, and $R^4O$ is present randomly or in block form; f is 0 to about 180, preferably with a mole ratio of $R^3:R^4$ of 100:0 to about 40:60.

Examples of substituted phenyl include mono-, di-, tri-, and tetrahalophenyl; mono-, di-, tri-, and tetra-$C_{1-4}$-alkoxyphenyl; mono-, di-, tri-, and tetra-$C_{1-4}$-alkyl-phenyl; mono- and dinitrophenyl; etc. Specific examples of substituted phenyl include o-, p-, and m-chlorophenyl; o-, p-, and m-methylphenyl; o-, p-, and m-nitrophenyl; o-, p-, and m-cyanophenyl; and o-, p-, and m-methoxyphenyl.

Another particularly preferred class of compounds containing an amino group includes the JEFFAMINE® monoamines available from Huntsman, having the general formula (III):

in which each R' independently of the other is H or methyl, R" is a residue derived from a monohydric alcohol (e.g., methoxy, ethoxy, propoxy, etc.), and x has a value such that the molecular weight of the compound of formula (III) is from about 600 to about 25,000. The ratio of R'=methyl to R'=H typically ranges from about 3:19 to about 9:1. Specific examples of such compounds include JEFFAMINE® XTJ-505 (M-600), JEFFAMINE® XTJ-506 (M-1000), JEFFAMINE® XTJ-507 (M-2005), JEFFAMINE® XTJ-508 (M-2070), and JEFFAMINE® 234.

It is preferred that the compound containing an amino group exhibit a water solubility of at least 5 g/l, preferably at least 500 g/l, at room temperature.

The ratio of the polyaspartic acid to the compound containing the amino group will depend on the graft density (GD) desired. In the context of the present invention, the term graft density (GD) refers to the average, numerical percentage of pendant carboxyl groups of the polyaspartic acid which are grafted with the compound containing an amino group:

$$GD=CA_g/(CA_g+CA_u)\times100$$

where $CA_g$ is the number of pendant carboxyl groups of the polyaspartic acid which are grafted and $CA_u$ is the number of pendant carboxyl groups of the polyaspartic acid which are ungrafted. For example, if the polyaspartic acid contains x equivalents of pendant carboxyl groups/gram and 0.25x equivalents/gram of these pendant carboxyl groups are grafted with the compound containing an amino group and 0.75x of these pendant carboxyl groups are ungrafted, then the GD is 25%:

$$GD=0.25x/\,(0.25x+0.75x)\times100=25\%$$

The graft efficiency of the reaction is such that the compound containing an amino group is typically added in amount which is equivalent to or only slightly greater than that theoretically required to achieve the desired graft density. Thus, when it is desired to produce a graft polymer with a graft density of a certain percentage starting with a polyaspartic acid which contains Y equivalents of pendant carboxyl groups per gram, the compound which contains an amino group is suitably added in an amount of A, according to the following formula:

$$A=((GD\times Y)+Z)/100$$

where A is the number of equivalents of amino groups added per gram of polyaspartic acid, GD is the numerical percentage of desired graft density, Y is the equivalents of pendant carboxyl groups per gram of polyaspartic acid, and Z is 0 to 50%, preferably 0 to 25% of GD. Using the present method it is possible to achieve graft densities approaching 100%.

Preferably, the polyaspartic acid and the compound containing an amino group are combined to form an intimate mixture prior to heating. A preferred method for forming an intimate mixture of the polyaspartic acid and the compound containing an amino group is to form an aqueous solution or dispersion of the polyaspartic acid and the compound containing an amino group. Typically, the aqueous dispersion is formed by mixing the polyaspartic acid and the compound containing an amino group in the desired ratio with sufficient water to result in a solution or dispersion with a total solids content of 700 g/l, preferably 500 g/l. It is also possible to include some low boiling organic solvent which is miscible with water, such as methanol, ethanol, or acetone, to assist in solubilizing or dispersing the compound containing an amino group.

The water (and possible organic solvent) in the aqueous dispersion or solution may be removed prior to the heating step to afford a dry, intimate mixture of the polyaspartic acid and the compound containing an amino group. The water (and possible organic solvent) may be removed by any conventional process, such as rotary evaporation, forced air at 50° C. to 80° C., or lyophilization. It is preferred that the water be removed under conditions in which the hydrolysis of the polyaspartic acid is minimized.

Alternatively, the heating step may be commenced prior to the removal of the water (and possible organic solvent). In this case, the heating is carried out in either an open vessel or with some provision for removing vapors, and the water (and possible organic solvent) is driven off during the initial stages of the heating.

The mixture of the polyaspartic acid and the compound containing an amino group is suitably heated at a temperature of greater than 100° C., preferably 120 to 220° C., more preferably 150 to 200° C., for a time of 0.1 to 24 hours, preferably 0.25 to 12 hours, more preferably 0.5 to 8 hours. The heating step may be carried out without any stirring or the use of any special apparatus or equipment. Good results have been achieved using an inert atmosphere such as $N_2$.

After the heating step is complete, the product is typically obtained in the form of an oil or a solid. Then product may be used as is. In this state, ungrafted aspartic acid residues typically have been converted to succinimide residues, but upon addition with water to cementitious materials, the succinimide residues are ring-opened to the aspartate form due to the alkaline nature of the hydrating cement mixture. In the period of ring-opening, the presence of the succinimide residues may provide some increased dispersancy to the polymer. Alternatively, the product may be subjected to mild, alkaline hydrolysis to open the imide rings in the succinimide residues prior to use. Such hydrolysis may be accomplished by treating the product (in water, up to 60% by weight solids) with NaOH, KOH, or any such inorganic base, or simple organic base, while maintaining the pH in the range of 8 to 12, preferably about 8 to 10, and the temperature at 40° C. to 90° C., preferably 60° C. to 80° C., for a time of from about 10 minutes to about 8 hours, preferably 1 to 2 hours, or just until the product is solubilized and the pH is stable, indicating that no more COOH groups are being generated as a result of the ring opening of the succinimide residues.

The product solution may be used as is at that point, but is preferably neutralized to a pH of about 7 to 9 to avoid the possibility of alkaline hydrolysis of the polymer itself. Alternatively, the product may be spray dried or otherwise rendered as a solid.

Typically the grafting reaction proceed with a high graft efficiency of 50 to about 100%, more typically 80 to about 100%. In the context of the present invention the term graft efficiency is defined as:

$$GE = A'/A \times 100$$

where GE is the graft efficiency, A is the number of equivalents of amino groups per gram of polyaspartic acid added to the reaction, and A' is the number of equivalents of amino groups per gram of polyaspartic acid grafted to the polyaspartic acid.

The present method also affords the desired products in yields of, typically, 50 to about 100%, more typically 80 to about 100%, based on polyaspartic acid, and 50 to about 100, more typically 80 to about 100, based on the compound containing an amino group.

It is to be understood that the graft polymers in which compounds which contain amino groups are grafted to polyaspartic acid produced by the present process may then be partially or wholly neutralized. Thus, the product produced by the present process may ultimately take a form in which the pendant carboxyl groups which are not grafted to the compound containing an amine group remain in the salt form or all or some of these carboxyl groups are in the acid form. This complete or partial neutralization may be carried out by conventional treatment with a mineral acid or organic acid such as acetic acid. When the final product is to be used in a cementitious mixture which will be in contact with steel reinforcing bars, it may be preferred to use a mineral acid which does not contain chloride, such as sulfuric acid.

The method of the present invention affords graft polymers in which compounds which contain amino groups are grafted to polyaspartic acid, without requiring the use of organic solvents. The method of the present invention also avoids the production of hazardous byproducts or wastes.

In another embodiment, the present invention provides novel graft polymers in which a compound containing an amino group is grafted to a polyamide, such as polyaspartic acid or polyglutamic acid, containing pendant carboxylic acid groups in a graft density of at least 5%, preferably at least 10%, more preferably at least 20%. In the context of this embodiment, the polyamide containing pendant carboxylic acid groups is the same as that described and defined above in the context of the method for producing graft polymers. In this embodiment, it is also preferred that the polyamide containing pendant carboxylic acid groups be polyaspartic acid or polyglutamic acid.

In contrast, the compound which contains an amino group is defined as including those polyoxyalkylene amines of the general formulae (II) and (III), as defined above in the context of the method for producing graft polymers.

Although some graft polymers in which compounds which contain amino groups are grafted to polyaspartic acid are known, prior to the present invention, no method existed for grafting complex amines, such as those of formulae (II) or (III) to polyaspartic acid in a graft efficiency as high as 60% or a graft density as high as 20%.

As explained above in the context of the present method for producing graft polymers, the novel graft polymers of the present invention may exist in a form in which the pendant carboxyl groups which are not grafted to the compound containing an amine group are converted to succinimide residues and subsequently may be converted to the salt form or the acid form of aspartic acid residues.

The novel graft polymers of the present invention may be prepared by the method described above, with the use of a polyoxyalkylene amines of the general formulae (II) or (III).

The novel graft polymers of the present invention have the formula (IV):

wherein:
  each X independent of the other is hydrogen, an alkali metal ion, an alkaline earth metal ion, ammonium ion, or substituted ammonium;
  each —NH—Z— is a monomer unit derived from a compound which contains (i) a —NH$_2$ group and (ii) a —CO$_2$H or a —SO$_3$H group;
  m, m', n, and n' are each independently 0 or an integer between 1 and about 20, preferably 0 to 2;

the present invention are particularly useful for modifying the flow properties of cement.

In another embodiment, the present invention provides novel compositions, which comprise:

(a) a cementitious binder; and (b) the graft polymer of formula (IVa):

(IVa)

a, b, c, d and reflect the mole fraction of each unit wherein the sum of a+b+c+d equals one, wherein a is a decimal value of 0 to 0.75, preferably 0 to 0.70, more preferably 0 to 0.60; b is a decimal value of 0 to 0.75, preferably 0 to 0.70, more preferably 0 to 0.60; c is a decimal value of 0.25 to 1, preferably 0.3 to 1, more preferably 0.4 to 1; and d is a decimal value of 0 to 0.5, preferably 0 to 0.25; and Q has the formulae (V) or (VI):

$$—CH(R^2)—R^5—O—(R^3O)_e—(R^4O)_f—R^6 \quad (V)$$

wherein $R^2$ and $R^6$ are, each independently, H, phenyl, substituted phenyl, or $C_1$ to $C_4$ linear or branched alkyl, such as methyl, ethyl, propyl, or butyl; $R^5$ is phenyl or $C_1$ to $C_4$ linear or branched alkylene, such as methylene, ethylene, propylene, or butylene; $R^3$ is ethylene, and $R^3O$ is present randomly or in block form; e is 1 to about 300, preferably about 11 to about 300; $R^4$ is propylene, and $R^4O$ is present randomly or in block form; f is 0 to about 180, preferably with a mole ratio of $R^3:R^4$ of 100:0 to about 40:60.

$$—CH(CH_3)—CH_2—(OCH(R')CH_2)_xR'' \quad (VI)$$

in which each R' independently of the other is H or methyl, R'' is a residue derived from a monohydric alcohol (e.g., methoxy, ethoxy, propoxy, etc.), and x has a value such that the molecular weight of the group of formula (VI) is from about 600 to about 25,000. The ratio of R'=methyl to R'=H typically ranges from about 3:19 to about 9:1.

It is noted that the higher the proportion of propylene oxide present in the side chain, the less hydrophilic the side chain will be.

In formula (IV), preferably m, m', n, and n' are each independently an integer between 0 and 2. Most preferably, backbone is polyaspartic acid (n is 0 or 1 and m is 0 or 1) or polyglutamic acid (n is 0 or 2 and m is 0 or 2).

Examples of substituted ammonium include mono-, di-, tri-, and tetra-$C_{1-4}$-alkylammonium and mono-, di-, tri-, and tetra-$C_{2-4}$-alkoxyammonium.

The novel graft polymers of the present invention are useful in many applications including but not limited to dispersants, detergent additives, cement additives, water treatment additives, and others. The novel graft polymers of wherein:
  each X independent of the other is hydrogen, an alkali metal ion, an alkaline earth metal ion, ammonium ion, or substituted ammonium;
  each —NH—Z— is a monomer unit derived from a compound which contains (i) a —NH$_2$ group and (ii) a —CO$_2$H or a —SO$_3$H group;
  m, m', n, and n' are each independently 0 or an integer between 1 and about 20, preferably 0 to 2;
  a, b, c, d and reflect the mole fraction of each unit wherein the sum of a+b+c+d equals one, wherein a is a decimal value of 0 to 0.95, preferably 0 to 0.85, more preferably 0 to 0.75; b is a decimal value of 0 to 0.95, preferably 0 to 0.85, more preferably 0 to 0.75; c is a decimal value of 0.05 to 1, preferably 0.15 to 1, more preferably 0.25 to 1; and d is a decimal value of 0 to 0.5, preferably 0 to 0.25; and Q has the formulae (V) or (VI):

$$—CH(R^2)—R^5—O—(R^3O)_e—(R^4O)_f—R^6 \quad (V)$$

wherein $R^2$ and $R^6$ are, each independently, H, phenyl, substituted phenyl, or $C_1$ to $C_4$ linear or branched alkyl, such as methyl, ethyl, propyl, or butyl; $R^5$ is phenyl or $C_1$ to $C_4$ linear or branched alkylene, such as methylene, ethylene, propylene, or butylene; $R^3$ is ethylene, and $R^3O$ is present randomly or in block form; e is 1 to about 300, preferably about 11 to about 300; $R^4$ is propylene, and $R^4O$ is present randomly or in block form; f is 0 to about 180, preferably with a mole ratio of $R^3:R^4$ of 100:0 to about 40:60.

$$—CH(CH_3)—CH_2—(OCH(R')CH_2)_xR'' \quad (VI)$$

in which each R' independently of the other is H or methyl, R'' is a residue derived from a monohydric alcohol (e.g., methoxy, ethoxy, propoxy, etc.), and x has a value such that the molecular weight of the group of formula (VI) is from about 600 to about 25,000. The ratio of R'=methyl to R'=H typically ranges from about 3:19 to about 9:1.

Suitable cementitious binders include Portland cement, alumina cement, or blended cement, for example pozzolanic cement, slag cement, or other types, Portland cement being the preferred. The graft polymer of formula (IVa) is added to the present compositions in an amount from about 0.001 to about 5.0%, preferably from about 0.01 to about 3.0%, more preferably about 0.05 to about 1.0% by weight, based on the total weight of the cementitious binder.

In a preferred embodiment, the graft polymer of formula (IVa) is the graft polymer of formula (IV).

When actually used, water is typically added to the present compositions. The water is typically added in an amount of 20 to 70% by weight, preferably 25 to 50% by weight, based on the total weight of the cementitious binder.

The present composition may further comprise an aggregate such sand, stone, slag, and mixtures thereof. Thus, the present composition may take the form of cement, mortar, concrete, etc.

Suitably, for example, the dispersant is preferably added prior to, during, or after initial mixing, to a cementitious composition mixture of a hydraulic cement, water, and aggregate, in which a reduced amount of water can be used compared to mixtures not containing the dispersant. The proportion of cement, water, and aggregate (if any) used in the cementitious composition mixture depends upon the end use desired, and is within the knowledge of the skilled artisan for a selected use.

The inventive polymer dispersant may be added to many different types of cementitious mixtures, and is not limited to the mixtures described above. Cementitious mixes in which the inventive polymer dispersant can be used as additives are mortars and concretes. The hydraulic binder used in the cementitious composition may be Portland cement, alumina cement, or blended cement, for example pozzolanic cement, slag cement, or other types, Portland cement being the preferred. Conventional admixtures in cement technology, such as set accelerators or retarders, frost protection agents, pigments and the like, may also be present in the cementitious mixes of the invention. The inventive polymer dispersant is capable of providing a Type A and Type F water-reducing effect, as defined in ASTM C494, Standard Specification for Chemical Admixtures for Concrete.

In another embodiment, the present invention provides a method for improving the flow properties of a cementitious composition, comprising adding an effective amount of the graft polymer of formula (IVa) to a cementitious composition which comprises a cementitious binder. The cementitious binder may be Portland cement, alumina cement, or blended cement, for example pozzolanic cement, slag cement, or other types, Portland cement being the preferred. The graft polymer of formula (IVa) is added to the cementitious composition in an amount from about 0.001 to about 5.0%, preferably from about 0.01 to about 3.0%, preferably about 0.05 to about 1.0% by weight, based on the total weight of the cementitious binder. In a preferred embodiment, the graft polymer of formula (IV) is added to the cementitious composition.

Water may be added to the cementitious composition in an amount of 20 to 70% by weight, preferably 25 to 50% by weight, based on the total weight of the cementitious binder. However, it is to be understood that the water need not be added to the cementitious composition until just prior to pouring. Thus, the graft polymer may be mixed with the cementitious binder and the resulting mixture may be stored or sold as is with the addition of any water occurring later. Alternatively, the graft polymer may be added to the mixing water, prior to mixing with the cementitious binder, in an amount of from about 0.001 to about 5.0%, preferably from about 0.01 to about 3.0%, more preferably about 0.05 to about 1.0%, by weight, based on the total weight of the cementitious binder.

The cementitious composition to which the graft polymer of formula (IVa) is added may further comprise an aggregate such sand, stone, slag, and mixtures thereof. Thus, the cementitious composition may be a cement, mortar, concrete, etc. It should be understood that the aggregate need not be added to the cementitious composition until just prior to pouring, if any is to be added at all. Thus, the graft polymer may be mixed with the cementitious binder and the resulting mixture may be stored or sold as is with the addition of any aggregate occurring later.

In another embodiment, the present invention provides a method for reducing the amount of water which is needed to prepare a cementitious composition with suitable flow properties, comprising adding an effective amount of a graft polymer of formula (IVa) to a cementitious composition which comprises a cementitious binder. The cementitious binder may be Portland cement, alumina cement, or blended cement, for example pozzolanic cement, slag cement, or other types, Portland cement being the preferred. The graft polymer of formula (IVa) is added to the cementitious composition in an amount from about 0.001 to about 5.0%, preferably from about 0.01 to about 3.0%, preferably about 0.05 to about 1.0% by weight, based on the total weight of the cementitious binder. In a preferred embodiment, the graft polymer of formula (IV) is added to the cementitious composition.

By means of this method it is possible to reduce the water of addition needed to achieve good flow properties. Thus, water may be added to the cementitious composition in an amount of 20 to 70% by weight, preferably 25 to 50% by weight, based on the total weight of the cementitious binder. However, it is to be understood that the water need not be added to the cementitious composition until just prior to pouring. Thus, the graft polymer may be mixed with the cementitious binder and the resulting mixture may be stored or sold as is with the addition of any water occurring later. Alternatively, the graft polymer may be added to the mixing water, prior to mixing with the cementitious binder, in an amount of from about 0.001 to about 5.0%, preferably from about 0.01 to about 3.0%, more preferably about 0.05 to about 1.0%, by weight, based on the total weight of the cementitious binder.

The cementitious composition may further comprise an aggregate such sand, stone, slag, and mixtures thereof. Thus, the cementitious composition may be a cement, mortar, concrete, etc. It should be understood that the aggregate need not be added to the cementitious composition until just prior to pouring, if any is to be added at all. Thus, the graft polymer may be mixed with the cementitious binder and the resulting mixture may be stored or sold as is with the addition of any aggregate occurring later.

Other features of the invention will become apparent in the course of the following descriptions of exemplary embodiments which are given for illustration of the invention and are not intended to be limiting thereof.

EXAMPLES

I. Methods

A. Infrared Spectroscopy:

Infrared spectra of polysuccinimides and polyaspartates were measured by use of an FTIR spectrophotometer (Perkin Elmer, model 1600). Samples were mixed in KBr and disc pellets (13 mm) were made at 9000 lbs. for 3 minutes by use of a die (Spectratech) and press (Carver, Inc.).

Infrared spectra of grafted polyaspartates were measured by use of a Bio Rad FTIR (model FTS 175) with a single-bounce ATR (attenuated total reflectance) apparatus containing a silicon window. The spectra were ATR corrected.

B. Molecular Weight:

Molecular weights of polymers were determined by gel permeation. For polysuccinimides and polyaspartates, the standards were polyaspartates made in-house by solid-phase methods ($ASp_5$ through $Asp_{60}$) and commercial polyaspartates (up to 32,000 MW; low-angle, laser light scattering, Sigma Chemical). A liquid chromatograph (Varian, model 5500) with a 7.5 mm×30 cm column (G 4000 PW, Phenomenex) was used. The mobile phase was 0.01 M Tris, 0.1 M NaCl, pH 8.00, flow of 1 ml/min, with UV detection at 235 nm.

For grafted polyaspartates, the standards were polyethylene glycols (Polysciences). A Waters 600 liquid chromatograph, Alltech Varex MKIII detector, and Shodex OH Pak columns were used.

C. Phosphate Analysis:

Polymers that were synthesized in the presence of phosphoric catalysts/solvents were cleansed by washing and dialysis. The removal of the catalyst/solvent was confirmed by use of the spectrophotometric assay for the phosphomolybdate complex which is formed in the presence of soluble inorganic phosphate (Eisenreich et al., *Environmental Letters,* vol. 9, pp. 43–53 (1975)). The polymers themselves also tested negatively for phosphorus, following acid hydrolysis to release bound phosphorus, if any, as inorganic phosphoric acid.

D. Cement Dispersancy:

Cement paste samples were prepared by mixing 500 g of Ashgrove I cement with water to obtain a final 0.35 water to cement ratio (w/w), including the water added with the dispersant. The additive solution was then mixed with the cement paste by use of a mechanical mixer at 700 revolutions per minute for one minute. Flow was measured by transferring 300 g of paste to a 7.5 cm, 60-degree glass funnel. The amount of paste that flowed from the funnel versus time was recorded. Spread was measured by filling a cylindrical cup (4 cm diameter, 7 cm height) with paste, covering the open end with a 23 cm by 23 cm plate, inverting the cup, then placing it on a level surface. The cup was lifted and the average spread diameter was recorded.

II. Examples

Figure 1:
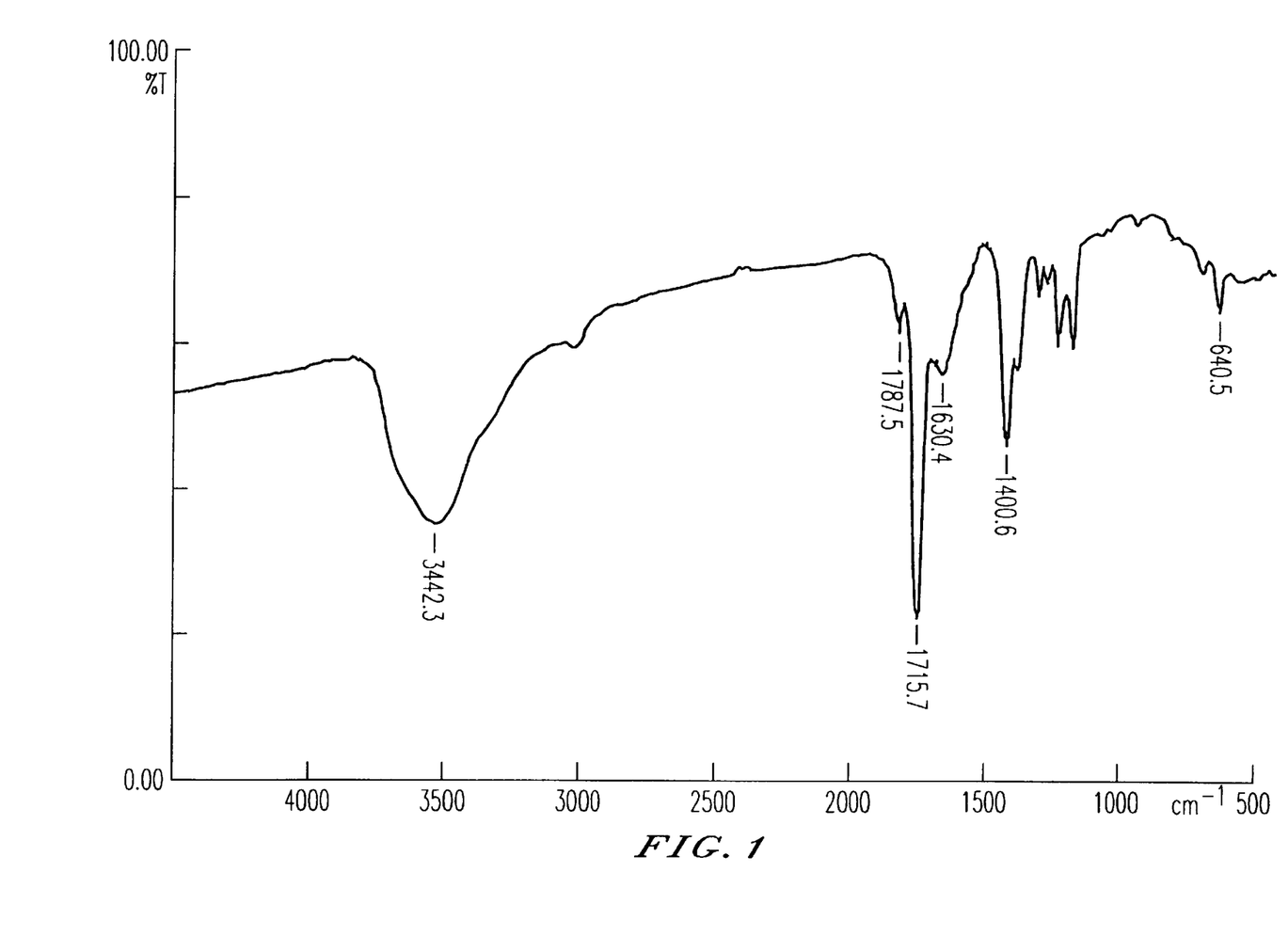
FIG. 1 is the infrared spectrum of the polysuccinimide prepared in Preparative Example 1, thermal polymer of aspartic acid, 220° C., 8 hours. Notice the prominent imide peak at ~1716 $cm^{-1}$. There also is some indication of amide linkages as shown by a small peak at ~1630 $cm^{-1}$ that is thought to be associated with a small number of branch points of this type of polysuccinimide. The carboxyl signal at 1400 $cm^{-1}$ is associated with the C-termini of the main polymer chains and the branches.

Preparation Example 1
Preparation of Low Molecular Weight (MW) Polysuccinimide and Sodium Polyaspartate by Dry, Thermal Polymerization of Aspartic Acid A sample of 100 g of aspartic acid (Sigma Chemical Company) in a 600 ml beaker was placed in an oven equipped with a J-Kem temperature controller, model 250, and the temperature was maintained at 220° C.±1° C. After 8 hours of reaction, the sample was removed, allowed to cool, and placed in a sample bottle. The product was collected in nearly quantitative yield (96% of theoretical) and was shown to be polysuccinimide by infrared spectroscopy (see FIG. 1).

Figure 2:
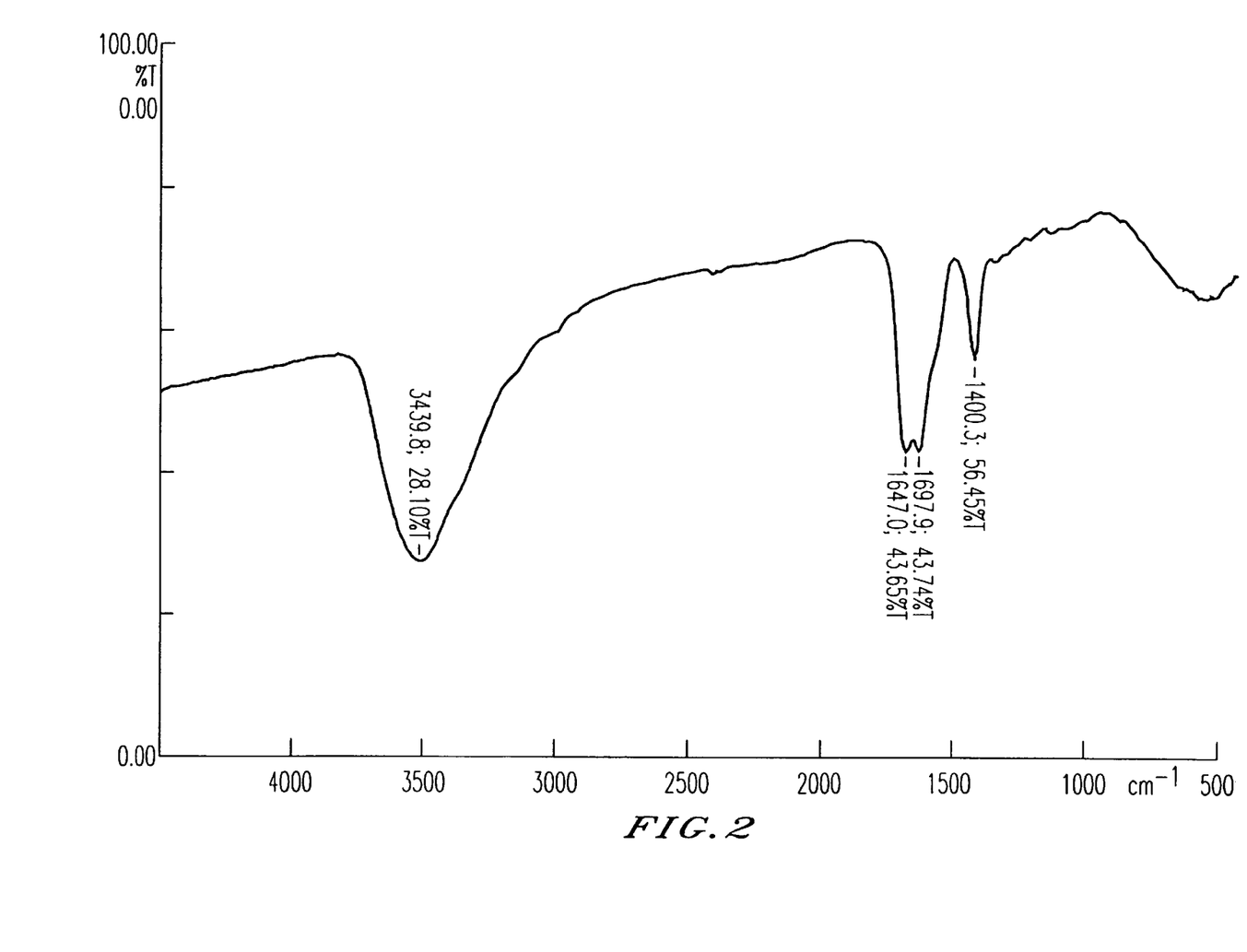
FIG. 2 is the infrared spectrum of the polyaspartate prepared by mild alkaline hydrolysis of the polysuccinimide prepared in Preparative Example 1. Notice the characteristic amide doublet at ~1600 and 1650 $cm^{-1}$, as well as the carboxyl signal at 1400 $cm^{-1}$.

A sample of the polysuccinimide was converted to polyaspartate in aqueous solution by mild alkaline hydrolysis at pH 10 at 60° C. for 2 hours via dropwise addition of 10 N NaOH. The solution was dialyzed (Spectrapor tubing, MW cutoff of 1000) against distilled water, then lyophilized to yield sodium polyaspartate, as also shown by infrared spectra (see FIG. 2). The gel permeation MW was 2700. Polyaspartates made in-house by solid-phase peptide synthesis were used as standards.

Preparation Example 2
Preparation of High MW Polysuccinimide and Polyaspartate by Thermal Polymerization of Aspartic Acid in the Presence of Polyphosphoric Acid A sample of 250 g of aspartic acid was placed in a pyrex baking dish (10.5"×15"×2") and preheated to 100° C. Next, 37.5 ml of polyphosphoric acid (Sigma Chemical, density= 2.06) were added and mixed manually with the aspartic acid on a hotplate at 80° C. to form a paste. The elevated temperature rendered the polyphosphoric acid less viscous and pipettable, and permitted homogeneous mixing with the aspartic powder. The baking dish was then placed in a vacuum oven (VWR) at 190° C. for 4.5 hours at a pressure of 38 mm of Hg. The product rose in the dish to form a very light crusty material that was easily scraped onto a cellulose filter (Whatman #3) and washed under gentle vacuum with distilled water. When the pH of the filtrate became neutral, the product polysuccinimide was dried and obtained in nearly quantitative yield. The polysuccinimide was a light, cream color. It was free of phosphoric acid as measured spectrophotometrically.

A sample of this polysuccinimide was hydrolyzed at 80° C. and pH 10 for 2 hours by dropwise addition of 10 N NaOH. The resulting solution was dialyzed against distilled water then lyophilized to yield sodium polyaspartate, as shown by the IR spectrum. The gel permeation MW was 30,000. Commercial polyaspartates (Sigma Chemical) were used as standards.

Example 1
Grafting of Medium MW Methoxy Polyoxyalkylene Amine onto Low MW Polyaspartic Acid by Thermal Treatment at 180° C.

The polysuccinimide prepared in Preparation Example 1 was converted to sodium polyaspartate by mild alkaline hydrolysis, then to the polyaspartic acid by treatment with an insoluble acidic resin (Amberlyst 15). The solution of polyaspartic acid was separated from the resin by filtration. The concentration of polyaspartic acid was determined from the weight of solids on drying of known volumes of the solution.

A sample of 0.54 g of polyaspartic acid in 6.55 ml of water was placed in a 50 ml round-bottom flask. Next, 1.66 g of methoxy polyoxyalkylene amine (Jeffamine M-2070, MW 2000, mole ratio of propyleneoxide:ethyleneoxide 10:32, 0.47 meq $NH_2$/g, Huntsman Chemical) were added, along with 0.005 g of 4-methoxyphenol as an antioxidant. The reactant molar ratio of aspartic acid residues to polyoxyalkylene amine was 6:1. All reactants were soluble.

The flask was purged with dry $N_2$ and heated at 180° C. for 1.5 hours, producing a viscous amber oil. The oil was dissolved in aqueous NaOH at room temperature, yielding an aqueous solution at neutral pH of 20% solids by weight.

Infrared analysis of the product revealed a spectrum with peaks indicative of both amide and imide residues, and a large peak associated with derivatized side chains. Similarly, gel permeation chromatography of the product showed the presence of the derivatized polymer with only residual amounts of unreacted polymeric monoamine and with an estimated density of underivatized:derivatized residues of 5:1.

Example 2
Grafting of Low MW Methoxy Polyoxyalkylene Amine onto High MW Polyaspartic Acid by Thermal Treatment at 180° C.

The polysuccinimide prepared in Preparation Example 2 was converted to polyaspartic acid by the method of Example 1.

A sample of 1.13 g of polyaspartic acid in 6.21 ml of water was placed in a 50 ml round-bottom flask. Next, 2.01 g of methoxy polyoxyalkylene amine (Jeffamine M-1000,, MW 1000, mole ratio of propyleneoxide:ethyleneoxide 3:19, 0.98 meq $NH_2$/g, Huntsman Chemical) were added, along with 0.02 g of 4-methoxyphenol. The reactant molar ratio of aspartic acid residues to polyoxyalkylene amine was 5:1.

The clear solution in the flask was purged with $N_2$ and heated at 180° C. for 2 hours, producing an homogeneous, viscous oil. The oil was dissolved in aqueous NaOH at room temperature, yielding an aqueous solution at pH 7.6 of 20% solids by weight.

Figure 3:
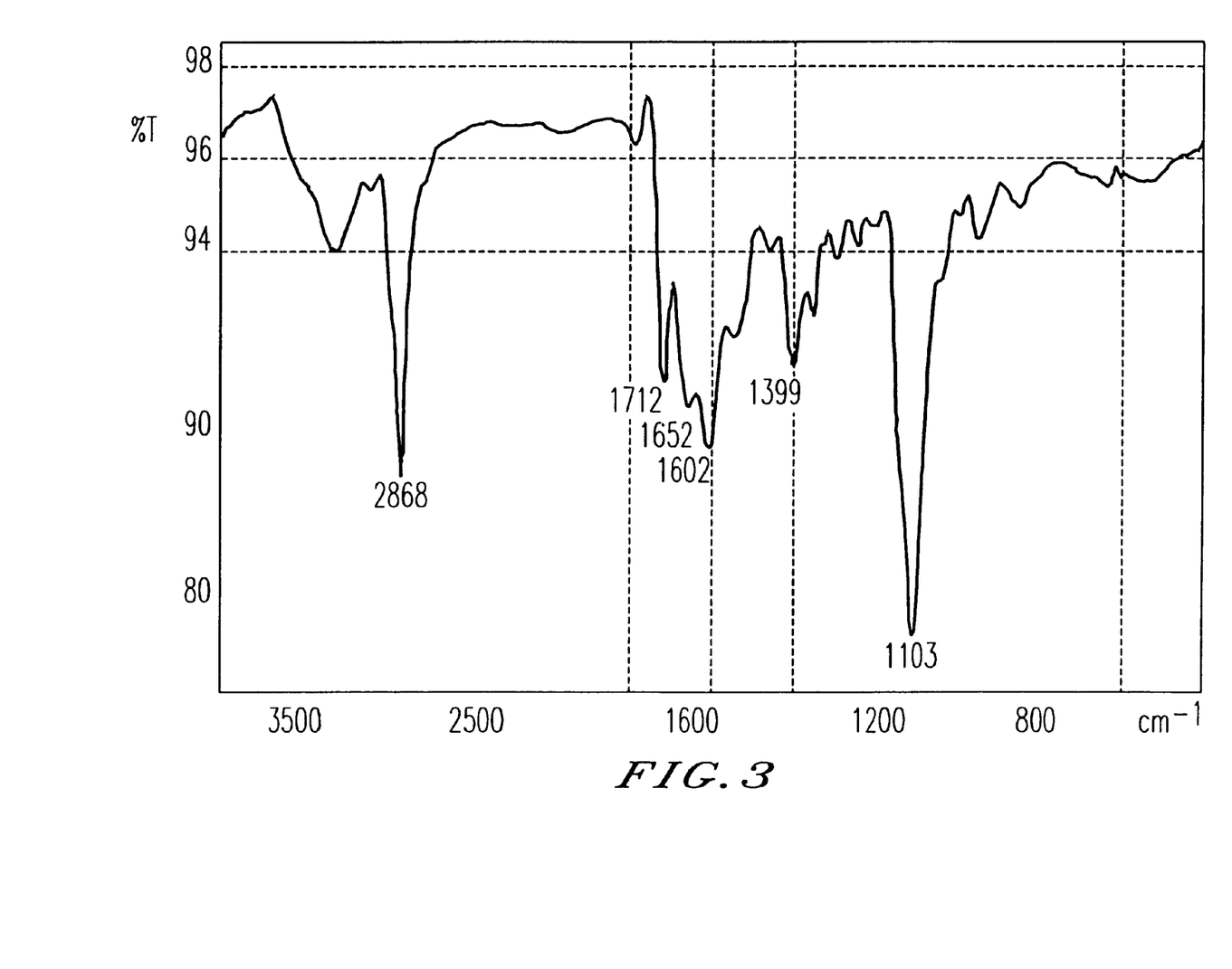
FIG. 3 is the infrared spectrum of the derivatized polyaspartate prepared in Example 2, a graft of low MW polyoxyalkylene amine and high MW polyaspartate. Notice some residual imide signal at ~1710 $cm^{-1}$, the amide signals around 1600 and 1650 $cm^{-1}$, the carboxyl signal at ~1400 $cm^{-1}$ and 1540 $cm^{-1}$, and a prominent peak associated with the polyoxyalkylene side chains at 1103 $cm^{-1}$.
Figure 4:
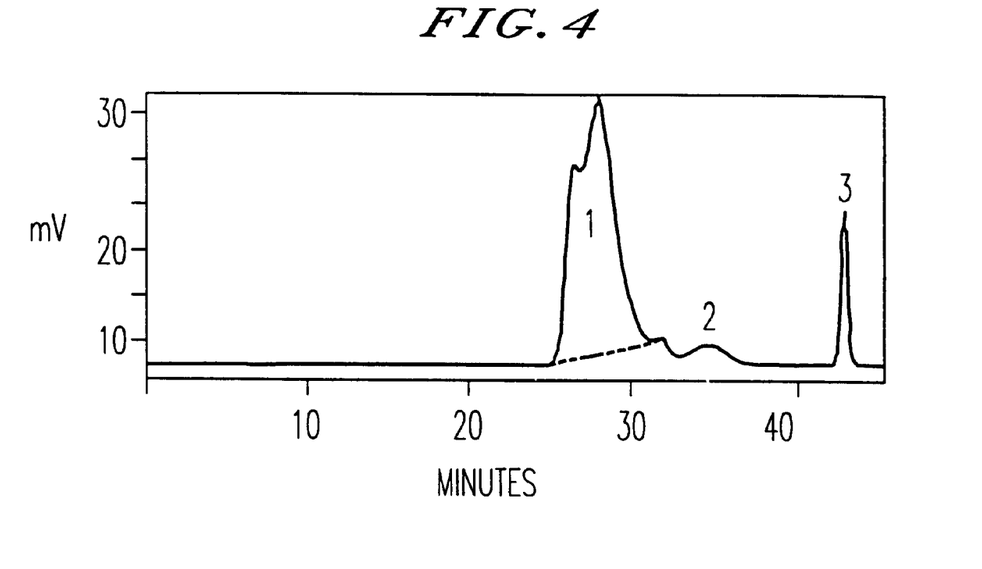
FIG. 4 is the gel permeation chromatography profile of the product of Example 2, an efficient thermal synthesis of a graft of low MW polyoxyalkylene amine and high MW polyaspartate. The derivatized polyaspartate eluted at about 28 minutes (peak 1), with the residual, unreacted polyoxyalkylene amine at 34 to 35 minutes (peak 2). The salt eluted at 43 minutes (peak 3). Compare to FIGS. 5 and 6 for examples of peaks of poorly grafted polyoxyalkylene amine under conditions of inefficient reaction with polysuccinimide or sodium aspartate.

Infrared and gel permeation chromatography analysis showed a mixed amide/imide polymer having derivatized side chains (see FIG. 3), with only residual amounts of unreacted polymeric monoamine and with an estimated graft density of underivatized:derivatized residues of 4:1 (see FIG. 4).

Example 3
Grafting of Medium MW Methoxy Polyoxyalkylene Amine onto High MW Polyaspartic Acid by Thermal Treatment at 180° C.

The procedures and reaction conditions of Example 2 were repeated except for use of 4.18 g of methoxy polyoxyalkylene amine (Jeffamine M-2070). The reactant molar ratio of aspartic acid residues to polyoxyalkylene amine was 5:1.

Again, an amber, homogeneous oil was produced and solubilized in NaOH at room temperature to give an aqueous solution at pH 7.0 of 40% solids by weight. Infrared analysis showed a mixed amide/imide polymer having derivatized side chains, with an estimated graft density of underivatized:derivatized residues of 4:1. Accordingly, the graft efficiency was high, as shown by gel permeation chromotography profiles that revealed only residual amounts of unreacted polymeric monoamine.

Comparative Example 1
Grafting of Medium MW Methoxy Polyoxyalkylene Amine onto Low MW Polysuccinimide by Nucleophilic Addition in Dimethyl Formamide A sample of 4.0 g of the polysuccinimide prepared in Preparation Example 1 was dissolved in 20 g of dimethyl formamide (density at 20° C., 0.9487, Burdick and Jackson). Next, an amount of 21.9 g of methoxy polyoxyalkylene amine (Jeffamine M-2070) was added with magnetic stirring. The reaction was allowed to proceed for 23 hours at 80° C. The reactant molar ratio of succinimide residues to polyoxyalkylene amine was 4:1.

The product was separated as a reddish oil in ethyl ether. The ether was decanted and the oil dissolved in acetone, followed by further washing with ethyl ether. The product oil was then solidified by cooling on dry ice, followed by decanting of the ether and drying in vacuo. The product was dissolved in aqueous NaOH at 75° C. for 1.5 hours to give a solution at pH 7 of 40% solids by weight.

Figure 5:
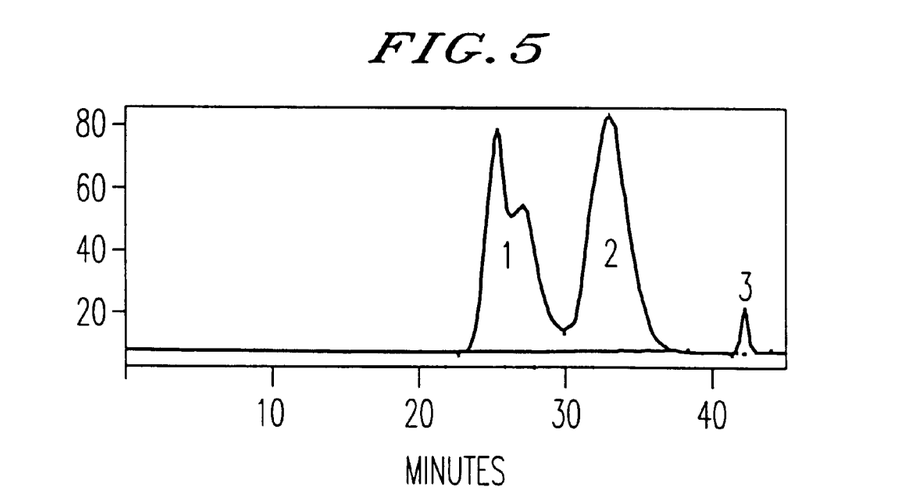
FIG. 5 is the gel permeation chromotography profile of the product of Comparative Example 1, grafting of a medium MW polyoxyalkylene amine onto a low MW polysuccinimide by nucleophilic addition in dimethyl formamide. The derivatized polyaspartate of this reaction eluted as a doublet between 22 and 28 minutes (peak 1), with the majority of the polyoxyalkylene amine remaining unreacted and eluting at about 34 minutes (peak 2): peak 3, salt.
Figure 6:
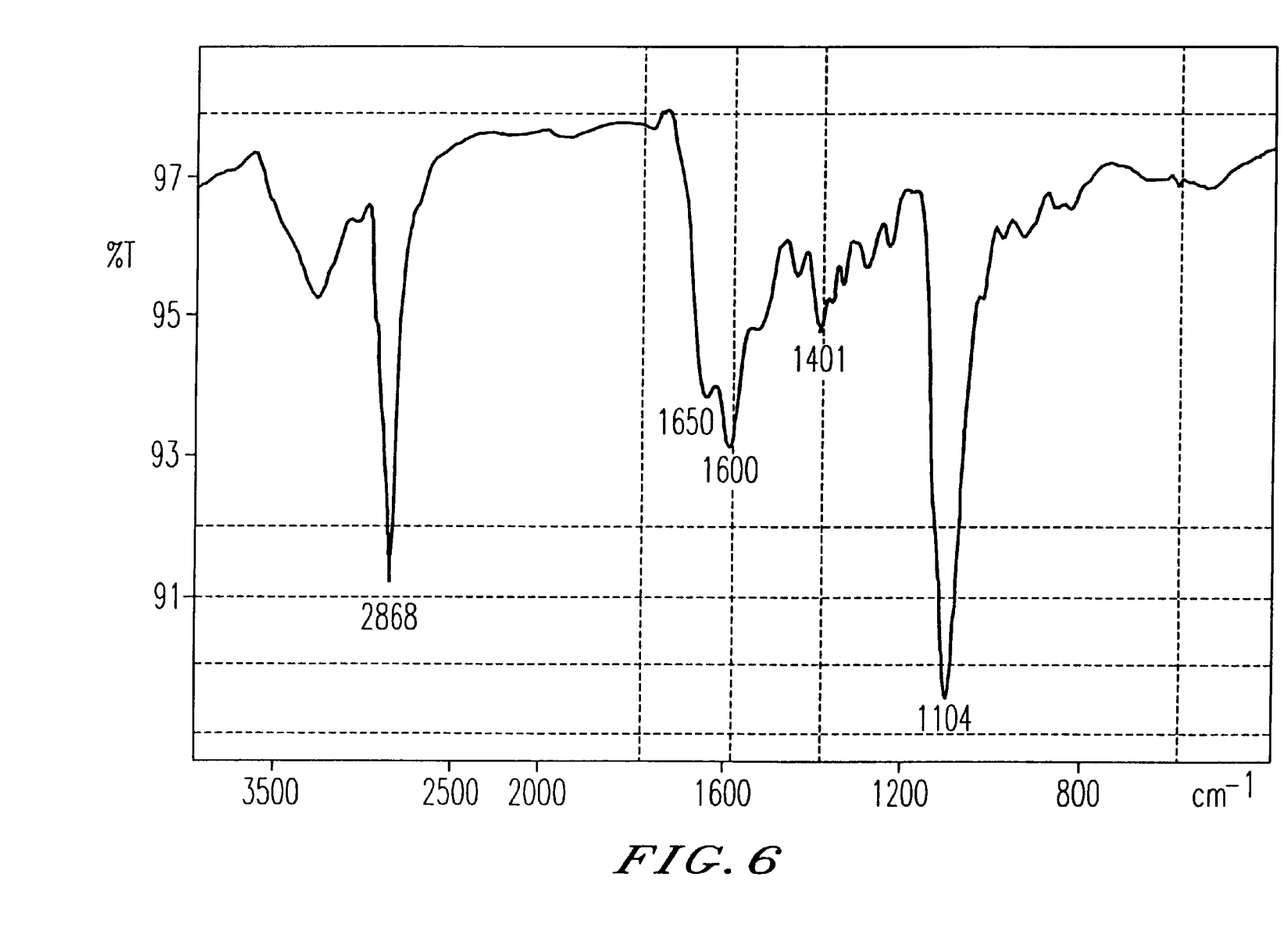
FIG. 6 is the infrared spectrum of the purified, derivatized polyaspartate of Comparative Example 1, a graft of medium MW polyoxyalkylene amine and low MW polysuccinimide by nucleophilic addition in dimethyl formamide. The amide signals are seen at 1600 and 1650 cm$^{-1}$, the polyoxyalkylene signal at 1104 cm$^{-1}$. There was essentially no imide signal, normally at 1710 cm$^{-1}$.

Based on the analysis of the peak sizes in the gel permeation profile (see FIG. 5), the graft efficiency was about 40%, with about 60% of the polyoxyalkylene amine ungrafted. The purified product was estimated to have a graft density with a residue ratio of aspartate:grafted aspartate of 9:1. The infrared spectrum of the purified product revealed a polymer having an amide structure with no measurable imide residues and a prominent peak at 1104 $cm^{-1}$ associated with the derivatized side chains (see FIG. 6).

Example 4
Utility of Grafts of Polyaspartic Acid and Polyoxyalkylene Amine as a Dispersant in Cement The performance of the grafted polyaspartic acids of the present invention as additives to cement was assessed. The paste samples were mixed as describe in the Cement Dispersancy section above for 1 minute prior to testing, with the exception of the sample treated with material of example 2, which was mixed for 10 minutes, then tested. The products of examples 1, 2, and 3 were tested without purification, the product of Comparative Example 1 was tested following purification and mild alkaline hydrolysis to convert succinimide residues to the aspartate form. All cement paste mixtures were tested at a water to cement ratio of 0.35 (w/w). Representative results of the effect on the flow and spread of cement paste mixtures are shown in the following table.

TABLE

| Material | % by weight cement powder | Initial Flow (g/sec) | Initial Spread (cm) |
| --- | --- | --- | --- |
| graft of polyaspartic acid: polyoxyalkylene amine of Example 1 | 0.1% | 76 | 12 |
| graft of polyaspartic acid: polyoxyalkylene amine of Example 2 | 0.1% | 50 | 10 |
| graft of polyaspartic acid: polyoxyalkylene amine of Example 3 | 0.1% | 46 | 10 |
| graft of polysuccinimide: polyoxyalkylene amine of Comparative Example 1 | 0.1% | 96 | 15 |
| control, no additive | 0% | 1 | 0 |

Comparative Example 2
Grafting of Low MW Methoxy Polyoxyalkylene Amine onto Low MW Polysuccinimide Acid by Nucleophilic Addition in the Absence of Solvent The polyoxyalkylene amine is itself a colorless, low-viscosity liquid when warmed. In this example, an attempt was made to derivatize polysuccinimide by nucleophilic addition of a monoamino polyoxyalkylene by mixing of the reactants in the absence of water or an organic solvent.

One gram of the polysuccinimide of the type prepared in Preparative Example 1 was combined in a glass test tube with 1.74 g of polyoxyalkylene monoamine (Jeffamine M-1000, 0.98 meq $NH_2$/g) to form a slurry with a reactant ratio of 6:1 succinimide residues:polymeric amine. The test tube was purged with dry $N_2$ and heated for 24 hours at 80° C.

The product was next treated with 0.4 g of 50% NaOH plus 5 ml of water and warmed at 40° C. to convert the succinimide residues to the aspartate form. The resulting, two-phase solution had a pH of approximately 7 at about 36% by weight solids. The formation of two solution phases at higher solids content coincided with poor graft efficiencies.

Figure 7:
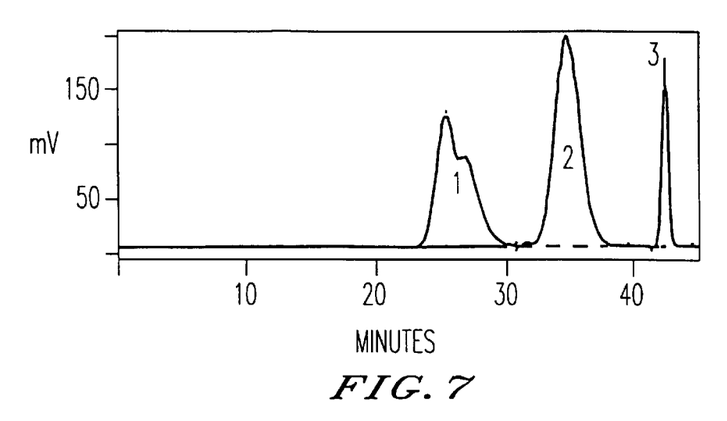
FIG. 7 is the gel permeation chromatography profile of products of the reaction of Comparative Example 2, an attempt to graft a low MW polyoxyalkylene amine onto a low MW polysuccinimide by nucleophilic addition in the absence of solvent. Peak 1, grafted polyaspartate: peak 2, unreacted polyoxyalkylene amine: peak 3, salt.

Gel permeation chromatography of the final product showed poor grafting of the polymeric amine to the polyaspartate, with most of the polyoxyalkylene amine eluting separately from the polyaspartate (see FIG. 7). The performance of the final product as an additive to cement was poor.

Comparative Example 3
Grafting of Low MW Methoxy Polyoxyalkylene Amine onto Low MW Polyaspartic Acid by Nucleophilic Addition in Water The reactants and procedures of Comparative Example 2 were repeated except that 4 ml of water were added to the mixture of polysuccinimide and polyoxyalkylene amine. The mixture was warmed to 50° C. and maintained at that temperature for 24 hours. The product again was converted to the aspartate form by mild alkaline hydrolysis, yielding a two-phase solution of approximately 40% solids by weight.

Gel permeation chromatography of the final product showed poor grafting of the polymeric amine to the polyaspartate, with most of the polyoxyalkylene amine eluting separately from the polyaspartate. The performance of the final product as an additive to cement was poor.

Comparative Example 4
Copolymerization of Sodium Aspartate and Monoamino Polyoxyalkylene by Thermal Treatment at 180° C.

A mixture of 10 g of aspartic acid (0.0751 mole) in 28 ml of water plus 26.6 g of monoamino polyoxyalkylene (Jeffamine M-2070, 0.47 meq $NH_2$/g, 0.0125 mole $NH_2$) was mixed with 4.7 g of 50% NaOH. The salt of sodium aspartate and polyoxyalkylene amine was formed by lyophilization, and a sample of 0.05 g of 4-methoxyphenol was added as an antioxidant. This mixture was heated in a flask in an oil bath at 180° C. for 20.5 hours. Subsamples were taken at 2, 4, 7, and 13.5 hours.

Figure 8A:
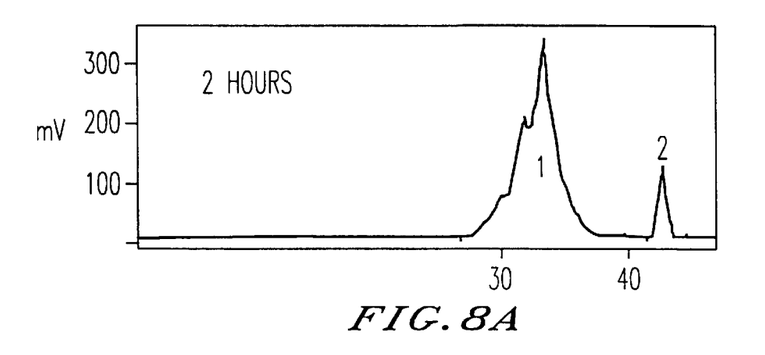
Figure 8B:
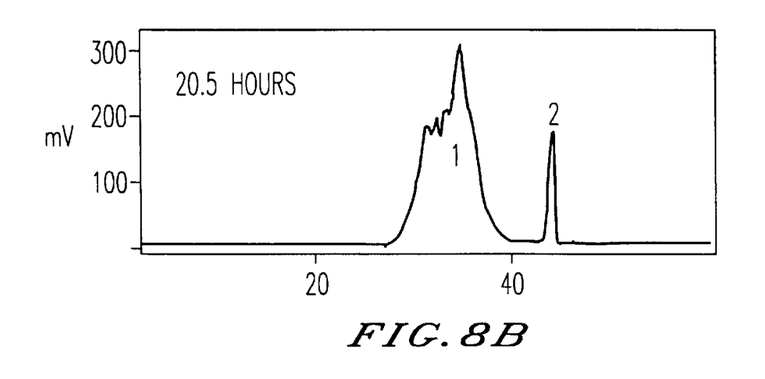

The samples were water-soluble, and were not further treated by mild alkaline hydrolysis. Gel permeation of the products revealed little change in the elution profiles versus time of reaction, suggesting poor chain lengthening (see FIG. 8). The performance of the final product as an additive to cement was poor.

Comparative Example 5
Grafting of Medium MW Methoxy Polyoxyalkylene Amine onto Low MW Polysuccinimide by Combined Nucleophilic and Thermal Treatment at 180° C.

Two grams of the polysuccinimide prepared in Preparative Example 1 were mixed with 7.30 g of polyoxyalkylene monoamine (Jeffamine M-2070) plus 0.5 ml of water, 0.1 g of 50% NaOH solution, and 0.02 g of 4-methoxyphenol in a 50 ml round-bottom flask. The mixture was heated at 180° C. under a stream of $N_2$ for 12 hours. The reactant molar ratio of succinimide residues to polyoxyalkylene amine was 6:1.

The product was dissolved in aqueous NaOH at room temperature to yield a solution of 40% solids by weight. Gel permeation chromatography of the product showed poor graft efficiency, with a dominant peak of unreacted polyoxyalkylene amine. The performance of the final product as an additive to cement was poor.

Obviously, numerous modifications and variations of the present invention are possible in light of the above teachings. It is therefore to be understood that, within the scope of the appended claims, the invention may be practiced otherwise than as specifically described herein.

What is claimed is:

1. A method for preparing a graft polymer, said method comprising:
   (i) heating an intimate mixture, substantially free of water and substantially free of organic solvent, of: (a) a polyamide which contains pendant carboxylic acid groups; and (b) a compound which contains an amino group of formula (III)

$$H_2N-CH(CH_3)-CH_2-(OCH(R')CH_2)_xR'' \qquad (III)$$

in which each R' independently of the other is H or methyl, R'' is a residue derived from a monohydric alcohol, and x has a value such that the molecular weight of said compound of formula (III) is from about 600 to about 25,000;
   to graft units of compound (b) onto the polyamide (a).

2. The method of claim 1, wherein said polyamide which contains pendant carboxylic acid groups is selected from the group consisting of polyaspartic acid, polyglutamic acid, and copolymers of aspartic acid and glutamic acid.

3. The method of claim 1, wherein said polyamide which contains pendant carboxylic acid groups is polyaspartic acid.

4. The method of claim 3, wherein the polyaspartic acid has at least 75% of its pendant carboxy groups as acid groups, not salified.

5. The method of claim 3, wherein the polyaspartic acid has essentially 100% of its pendant carboxy groups as acid groups, not salified.

6. The method of claim 1, wherein said heating said intimate mixture of: (a) a polyamide which contains pendant carboxylic acid groups; and (b) a compound which contains an amino group is carried out without condensing and returning solvent to said intimate mixture.

7. The method of claim 1, wherein the graft efficiency of the compound (b) onto the polyamide (a) is from 50 to 100%.

8. The method of claim 1, wherein the graft efficiency of the compound (b) onto the polyamide (a) is from 80 to 100%.

9. A method for preparing a graft polymer, said method comprising:
   (i) heating an intimate mixture, substantially free of water and substantially free of organic solvent, of: (a) a polyamide which contains pendant carboxylic acid groups; and (b) a compound which contains an amino group of the formula (II):

$$H_2N-CH(R^2)-R^5-O-(R^3O)_e-(R^4O)_f-R^6 \qquad (II)$$

wherein $R^2$ and $R^6$ are, each independently, H, phenyl, substituted phenyl, or $C_1$ to $C_4$ linear or branched alkyl; $R^5$ is phenyl or $C_1$ to $C_4$ linear or branched alkylene; $R^3$ is ethylene; $R^3O$ is present randomly or in block form; e is 1 to about 300; $R^4$ is propylene; $R^4O$ is present randomly or in block form; and f is 0 to about 180;
   to graft units of compound (b) onto the polyamide (a).

10. The method of claim 9, wherein said polyamide which contains pendant carboxylic acid groups is selected from the group consisting of polyaspartic acid, polyglutamic acid, and copolymers of aspartic and glutamic acid.

11. The method of claim 9, wherein said polyamide which contains pendant carboxylic acid groups is polyaspartic acid.

12. The method of claim 11, wherein the polyaspartic acid has at least 75% of its pendant carboxy groups as acid groups, not salified.

13. The method of claim 11, wherein the polyaspartic acid has essentially 100% of its pendant carboxy groups as acid groups, not salified.

14. A graft polymer, produced by a process comprising:
   (i) heating an intimate mixture, substantially free of water and substantially free of organic solvent, of: (a) a polyamide which contains pendant carboxylic acid groups; and (b) a compound which contains an amino group, to obtain said graft polymer, wherein said compound which contains an amino group has the formula (II):

$$H_2N—CH(R^2)—R^5—O—(R^3O)_e—(R^4O)_f—R^6 \quad (II)$$

wherein $R^2$ and $R^6$ are, each independently, H, phenyl, substituted phenyl, or $C_1$ to $C_4$ linear or branched alkyl; $R^5$ is phenylene or $C_1$ to $C_4$ linear or branched alkylene; $R^3$ is ethylene; $R^3O$ is present randomly or in block form; e is 1 to about 300; $R^4$ is propylene; $R^4O$ is present randomly or in block form; and f is 0 to about 180; and wherein said polyamide which contains pendant carboxylic acid groups and said compound which contains an amino group are present in relative amounts such that said graft polymer has a graft density of at least 25%.

15. The graft polymer of claim 14, wherein said polyamide which contains pendant carboxylic acid groups is selected from the group consisting of polyaspartic acid, polyglutamic acid, and copolymers of aspartic acid and glutamic acid.

16. The graft polymer of claim 14, wherein said polyamide which contains pendant carboxylic acid groups is polyaspartic acid.

17. The graft polymer of claim 14, wherein said heating said intimate mixture of: (a) a polyamide which contains pendant carboxylic acid groups; and (b) a compound which contains an amino group is carried out without condensing and returning solvent to said intimate mixture.

18. The graft polymer of claim 14, wherein said graft polymer has a graft density of at least 30%.

19. A graft polymer, produced by a process comprising:
(i) heating an intimate mixture, substantially free of water and substantially free of organic solvent, of: (a) a polyamide which contains pendant carboxylic acid groups; and (b) a compound which contains an amino group, to obtain said graft polymer, wherein said compound which contains an amino group has the formula (III):

$$H_2N—CH(CH_3)—CH_2—(OCH(R')CH_2)_xR'' \quad (III)$$

in which each R' independently of the other is H or methyl, R" is a residue derived from a monohydric alcohol, and x has a value such that the molecular weight of said compound of formula (III) is from about 600 to about 25,000; and wherein said polyamide which contains pendant carboxylic acid groups and said compound which contains an amino group are provided in relative amounts such that the graft polymer has a graft density of at least 20%.

20. The graft polymer of claim 19, wherein said polyamide which contains pendant carboxylic acid groups is selected from the group consisting of polyaspartic acid, polyglutamic acid, and copolymers of aspartic acid and glutamic acid.

21. The graft polymer of claim 19, wherein said polyamide which contains pendant carboxylic acid groups is polyaspartic acid.

22. The graft polymer of claim 19, wherein said heating is carried out in the solid state.

23. The graft polymer of claim 19, wherein said graft polymer has a graft density of at least 30%.

24. A polymer of formula (IV):

wherein:

each X independent of the other is hydrogen, an alkali metal ion, an alkaline earth metal ion, ammonium ion, or substituted ammonium;

each —NH—Z— is a monomer unit derived from a compound which contains (i) a —NH$_2$ group and (ii) a —CO$_2$H or a —SO$_3$H group;

m, m', n, and n' are each independently 0 or an integer between 1 and about 20, a, b, c, d and reflect the mole fraction of each unit wherein the sum of a+b+c+d equals one, wherein a is a decimal value of 0 to 0.75; b is a decimal value of 0 to 0.75; c is a decimal value of 0.25 to 1; and d is a decimal value of 0 to 0.5; and Q has the formulae (V):

$$—CH(R^2)—R^5—O—(R^3O)_e—(R^4O)_f—R^6 \quad (V)$$

wherein $R^2$ and $R^6$ are, each independently, is H, phenyl, substituted phenyl, or $C_1$ to $C_4$ linear or branched alkyl; $R^5$ is phenyl or $C_1$ to $C_4$ linear or branched alkylene; $R^3$ is ethylene; $R^3O$ is present randomly or in block form; e is 1 to about 300, preferably about 11 to about 300; $R^4$ is propylene; $R^4O$ is present randomly or in block form; and f is 0 to about 180.

25. The polymer of claim 24, wherein m, m', n, and n' are each independently 0 to 2.

26. A polymer of formula (IV'):

wherein:

- each X independent of the other is hydrogen, an alkali metal ion, an alkaline earth metal ion, ammonium ion, or substituted ammonium;
- each —NH—Z— is a monomer unit derived from a compound which contains (i) a —$NH_2$ group and (ii) a —$CO_2H$ or a —$SO_3H$ group;
- m, m', n, and n' are each independently 0 or an integer between 1 and about 20,
- a, b, c, and d represent the mole fraction of each unit wherein the sum of a+b+c+d equals one, wherein a is a decimal value of 0 to 0.75; b is a decimal value of 0 to 0.75; c is a decimal value of 0.25 to 1; and d is a decimal value of 0 to 0.5; and
- Q has the formulae (VI):

$$—CH(CH_3)—CH_2—(OCH(R')CH_2)_xR'' \quad (VI)$$

in which each R' independently of the other is H or methyl, R" is a residue derived from a monohydric alcohol, and x has a value such that the molecular weight of the group of formula (VI) is from about 600 to about 25,000;

wherein the polymer of formula (IV') has at least 5 monomer units and the polymer has a density of grafted units, identified by the c value, of at least 20%.

27. The polymer of claim 26, wherein m, m', n, and n' are each independently 0 to 2.

28. The polymer of claim 26, wherein the polymer has a density of grafted units of at least 25%.

29. The polymer of claim 26, wherein m, m', n and n' are each independently 0 or an integer of 1 to 2.

* * * * *